March 17, 1931.    K. C. AUGENSTEIN    1,796,355
CHAIN
Filed Aug. 5, 1929
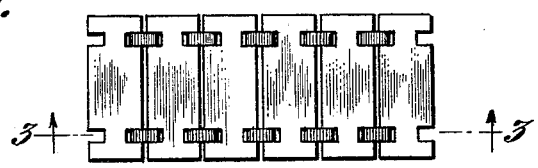
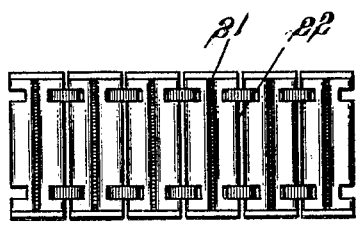
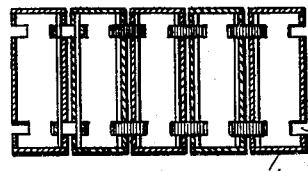
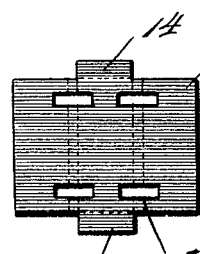
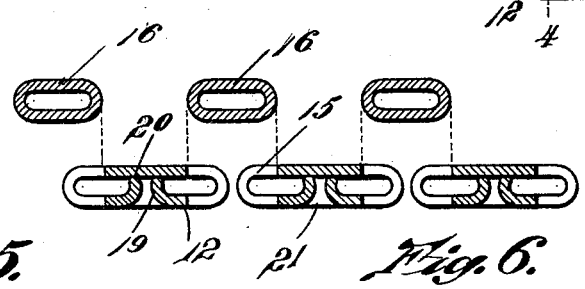
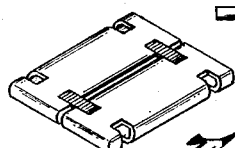
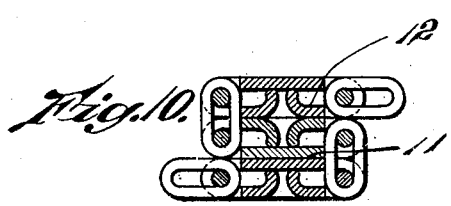
INVENTOR.
Karl C. Augenstein
BY Barlow & Barlow
ATTORNEYS.

Patented Mar. 17, 1931

1,796,355

UNITED STATES PATENT OFFICE

KARL C. AUGENSTEIN, OF CRANSTON, RHODE ISLAND, ASSIGNOR TO AUTOMATIC GOLD CHAIN CO., OF PROVIDENCE, RHODE ISLAND, A FIRM COMPOSED OF EDWIN F. M. SPEIDEL AND ALBERT E. R. SPEIDEL, BOTH OF EDGEWOOD, RHODE ISLAND

CHAIN

Application filed August 5, 1929. Serial No. 383,697.

This invention relates to a chain such as is employed for a flexible bracelet or the like; and has for its object to provide a construction which will be extremely flexible so that it may be doubled either backward or forward upon itself.

A further object of the invention is the provision of an extremely flexible construction from a minimum number of parts for convenience and quick assembly, each of which parts may be multiplied by machine operations.

A still further object of the invention is the construction of a chain which affords spaces additional to the spaces between its links, on its back surface for the gripping edge of a clamp or the like.

With these and other objects in view, the invention consists of certain novel features of construction, as will be more fully described, and particularly pointed out in the appended claims.

In the accompanying drawings:

Fig. 1 is a top plan view of the chain constructed in accordance with my invention.

Fig. 2 is a bottom plan view thereof.

Fig. 3 is a section on the line 3—3 of Fig. 1.

Fig. 4 is a section on a more reduced scale taken on the line 4—4 as shown in Fig. 3.

Fig. 5 is a top plan view of the blank used for the body link.

Fig. 6 is a sectional view somewhat diagrammatic and illustrating the relative positions of the body and connecting links before assembly.

Fig. 7 is a sectional view illustrating one of the operations in assembly.

Fig. 8 is a sectional view of another step in the operations of assembly.

Fig. 9 is a perspective view showing two of the links connected together.

Fig. 10 is a sectional view showing the chain doubled back upon itself, both forward and backward.

It is found in the construction and use of chains of the type worn for bracelets and the like that the chain is often subjected to a folding operation in a direction other than that intended, which often causes breakage or rupture of the parts; and in order to avoid this undesirable result I have connected the link units of the chain together so that the hinging in one direction is the same relative to the links as the hinging in an opposite direction, whereby the chain may be swung either to fold the top walls of its links together or to fold the back walls of its links together without breaking the parts or rupturing or straining them in any way; and the following is a detailed description of the present embodiment of this invention illustrating the preferred means by which these advantageous results may be accomplished.

With reference to the drawings, 10 designates a sheet metal blank of the body link of a series of units which is folded into somewhat of a hollow formation, as illustrated in section in Figs. 3 and 6, providing a top wall 11, bottom wall 12, end walls 13 and side walls 14. The end walls 13 together with the top and bottom walls adjacent the edges are notched as at 15 at spaced intervals inward from the side edge to permit insertion of the connecting links 16 which are generally in band shape and are shown for the purpose of this application as being formed from a seamless tube.

Each of these connecting links 16 is inserted into the notches 15 as illustrated in Fig. 6, after which pins 17 are passed through the connecting link 16 into the body links 11 to hingedly join the body links and connecting links together after which the side walls 14 are folded from the position illustrated in Fig. 7 to the position illustrated in Fig. 8 to complete the hollow structure and encase the pins 17 within the body link.

The construction thus formed is capable of extremely flexible folding such for instance as illustrated in Fig. 10, in which the top walls 11 are in contact, as shown in the lower part of the figure whereas the bottom walls 12 are also in contact, as illustrated in the upper part of Fig. 10, which may occur without danger of rupture or strain of the connecting parts of the chain.

In the folding of the bottom wall 12 into position the edge portions 19 of this bottom wall 12 are folded inwardly toward the top wall and in contact therewith, as illustrated at 20, so as to provide a groove or recess 21 intermediate the edges of the body link, which groove affords opportunity for engagement, the same as the space 22 formed between adjacent body links on the under side of the chain. This groove or recess permits the edge of a clamp to be inserted either into the groove 21 of the links or the space 22 between the links for various adjustments which are desired in connection with attaching the chain to an extension device, a wrist watch, or other article with which it is desired that the same be used.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A flexible chain comprising a series of hollow, substantially rectangular body links, each having transverse pins therein adjacent its opposite ends, and laterally-spaced connecting links embracing said transverse pins to hingedly connect the links together, said connecting links being of a longitudinal extent at least twice the thickness of the body links whereby to permit doubling of the chain with adjacent links lying one on the other.

2. A flexible chain comprising a series of hollow, substantially rectangular body links, each having transverse pins therein adjacent its opposite ends, and laterally-spaced connecting links positioned inwardly from the side edges of the chain embracing said transverse pins to hingedly connect the links together, said connecting links being of a longitudinal extent substantially twice the thickness of the body links to permit doubling of the chain upon itself.

3. A flexible chain comprising a series of box-shaped units, each comprising sheet metal top and bottom walls with integral end and side walls, the edges of said unit formed by the top, bottom and end walls being notched, tubular connecting links in said notches, and pins extending through said connecting links and encased in said units to hingedly connect them together.

4. A flexible chain comprising a series of box-shaped units, each comprising sheet metal top and bottom walls with integral end and side walls, a pair of pins enclosed within said units adjacent said ends walls, spaced openings in said top and bottom walls, and connecting links extending through said openings and embracing the pins of adjacent units to hingedly secure the links together.

5. A flexible chain comprising a series of body links, each formed of sheet metal and folded to provide a top wall and a bottom wall with the edges of the portions of the bottom wall extending toward each other in a plane parallel to the top wall and folded toward the top wall to provide a groove or recess in the bottom surface of the link similar to the space between adjacent body links and connecting links for hingedly joining the body links together, said bottom wall edge portions extending toward each other beyond the connecting means which hingedly join the body links together.

6. A flexible chain comprising a series of body links, each formed of sheet metal and folded to provide a top wall and a bottom wall with the edges of the portions of the bottom wall extending toward each other folded toward the top wall to provide a groove or recess in the bottom surface of the link similar to the space between adjacent body links, pins in the spaces at each side of said groove, and connecting links embracing the pins of adjacent links to hingedly connect the body links together.

In testimony whereof I affix my signature.

KARL C. AUGENSTEIN.